United States Patent
Cashman et al.

(10) Patent No.: US 7,562,163 B2
(45) Date of Patent: Jul. 14, 2009

(54) APPARATUS AND METHOD TO LOCATE A STORAGE DEVICE DISPOSED IN A DATA STORAGE SYSTEM

(75) Inventors: Paul Nicholas Cashman, Alton (GB); Lokesh Mohan Gupta, Tucson, AZ (US); Michael John Jones, Cedar Park, TX (US); Kenney Nian Gan Giu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 11/465,785

(22) Filed: Aug. 18, 2006

(65) Prior Publication Data

US 2008/0126626 A1 May 29, 2008

(51) Int. Cl.
*G06F 3/00* (2006.01)
*G06F 11/00* (2006.01)
(52) U.S. Cl. .............................. 710/16; 710/15; 714/42; 714/44
(58) Field of Classification Search .................. 710/62, 710/15, 16; 714/25
See application file for complete search history.

(56) References Cited

U.S. PATENT DOCUMENTS

| | | | | |
|---|---|---|---|---|
| 5,954,796 A | * | 9/1999 | McCarty et al. | 709/222 |
| 6,101,559 A | * | 8/2000 | Schultz et al. | 710/15 |
| 6,151,331 A | * | 11/2000 | Wilson | 370/465 |
| 6,157,962 A | * | 12/2000 | Hodges et al. | 710/1 |
| 6,199,122 B1 | * | 3/2001 | Kobayashi | 710/36 |
| 6,430,645 B1 | * | 8/2002 | Basham | 710/305 |
| 6,606,630 B1 | * | 8/2003 | Gunlock | 707/100 |
| 6,629,156 B1 | * | 9/2003 | Odenwald et al. | 710/8 |
| 6,678,839 B2 | * | 1/2004 | Mori | 714/44 |
| 6,684,266 B2 | * | 1/2004 | Faber et al. | 710/20 |
| 6,697,875 B1 | * | 2/2004 | Wilson | 709/245 |
| 6,820,172 B2 | * | 11/2004 | Nielsen et al. | 711/114 |

(Continued)

OTHER PUBLICATIONS

Chris Evans, "How to . . . interpret worldwide names", Oct. 8, 2003, TechWorld, http://www.techworld.com/storage/features/index.cfm?featureid=156.*

*Primary Examiner*—Alan S Chen
*Assistant Examiner*—Jonathan R Plante
(74) *Attorney, Agent, or Firm*—Dale F. Regelman; Quarles & Brady LLP

(57) ABSTRACT

A method is disclosed to locate a data storage device disposed in a data storage system. The method selects a target data storage device, identifies a target adapter port in communication with the target data storage device, and determines one or more target addresses, and determines one or more target World Wide Port Names ("WWPNs"). The method selects an enclosure, and a communication pathway disposed in that enclosure, and determines if any storage device ports interconnected with the communication pathway comprise a WWPN that matches any of said target WWPNs. If any storage device ports interconnected with the communication pathway comprise a WWPN that matches any of the target WWPNs, the method then identifies an adapter port in communication with that communication pathway, and determines if that any storage device ports in communication with the identified adapter port have claimed an address that matches a target address. If a storage device port in communication with the identified adapter port has claimed an address that matches a target address, then the method locates the target data storage device within the selected enclosure.

11 Claims, 4 Drawing Sheets

U.S. PATENT DOCUMENTS

| | | | |
|---|---|---|---|
| 6,829,657 B1 * | 12/2004 | Lynn et al. | 710/9 |
| 7,200,610 B1 * | 4/2007 | Prawdiuk et al. | 707/104.1 |
| 7,219,189 B1 * | 5/2007 | Ryu et al. | 711/111 |
| 7,260,656 B2 * | 8/2007 | Matsunami et al. | 710/36 |
| 2002/0012342 A1 * | 1/2002 | Oldfield et al. | 370/386 |
| 2002/0046276 A1 * | 4/2002 | Coffey et al. | 709/224 |
| 2002/0129230 A1 * | 9/2002 | Albright et al. | 713/1 |
| 2002/0174197 A1 * | 11/2002 | Schimke et al. | 709/220 |
| 2003/0137987 A1 * | 7/2003 | Beer et al. | 370/453 |
| 2003/0140277 A1 * | 7/2003 | Beer et al. | 714/25 |
| 2004/0117546 A1 | 6/2004 | Mizuno | |
| 2005/0025060 A1 * | 2/2005 | Fike et al. | 370/248 |
| 2005/0177648 A1 * | 8/2005 | Toyohara et al. | 710/1 |
| 2005/0238353 A1 | 10/2005 | McGlaughlin | |
| 2006/0034192 A1 * | 2/2006 | Hurley et al. | 370/254 |
| 2006/0034309 A1 | 2/2006 | Saklecha et al. | |
| 2006/0048018 A1 * | 3/2006 | Hosoya et al. | 714/48 |
| 2007/0067666 A1 * | 3/2007 | Ishikawa et al. | 714/6 |
| 2007/0088917 A1 * | 4/2007 | Ranaweera et al. | 711/148 |

* cited by examiner

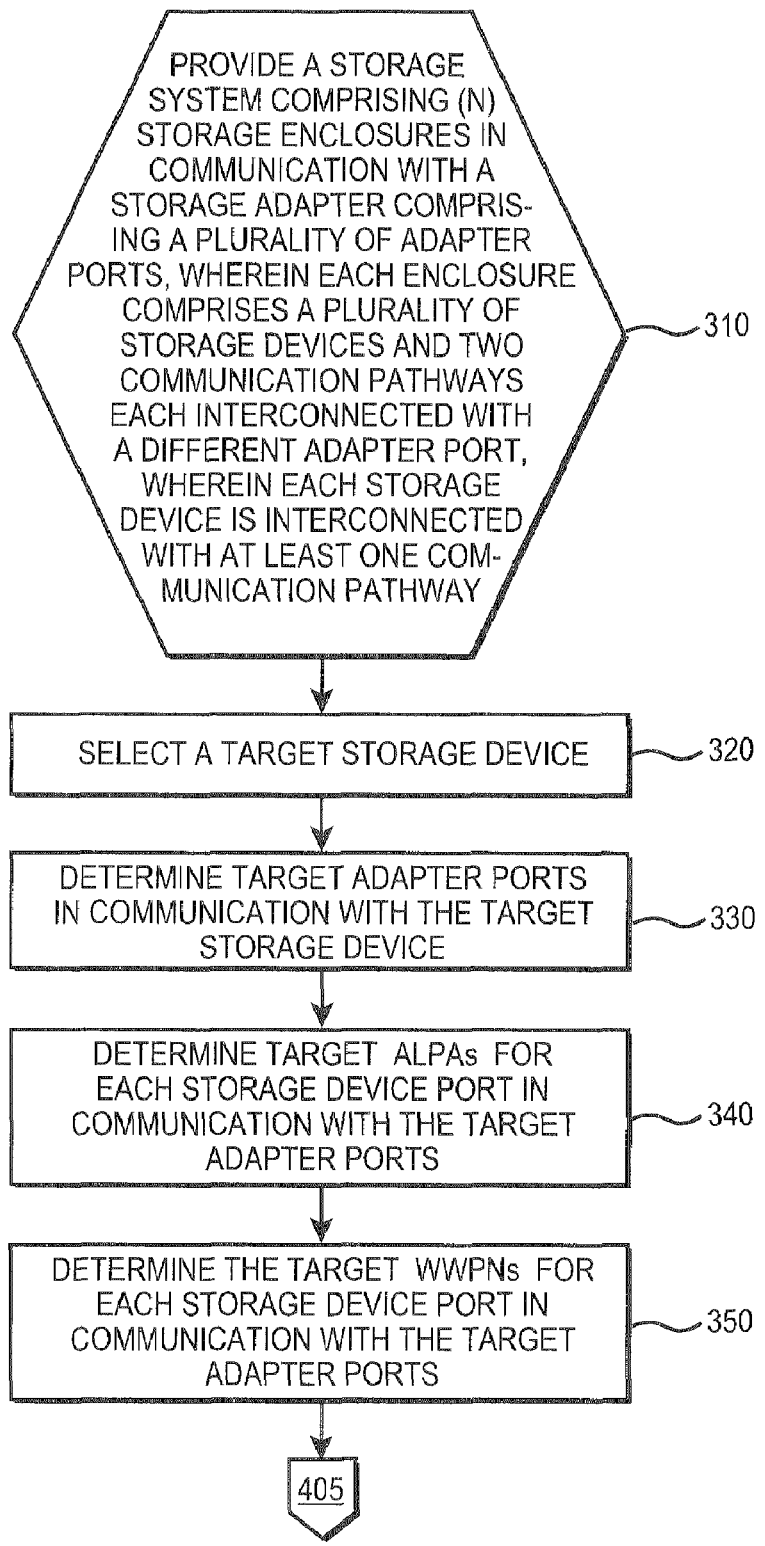

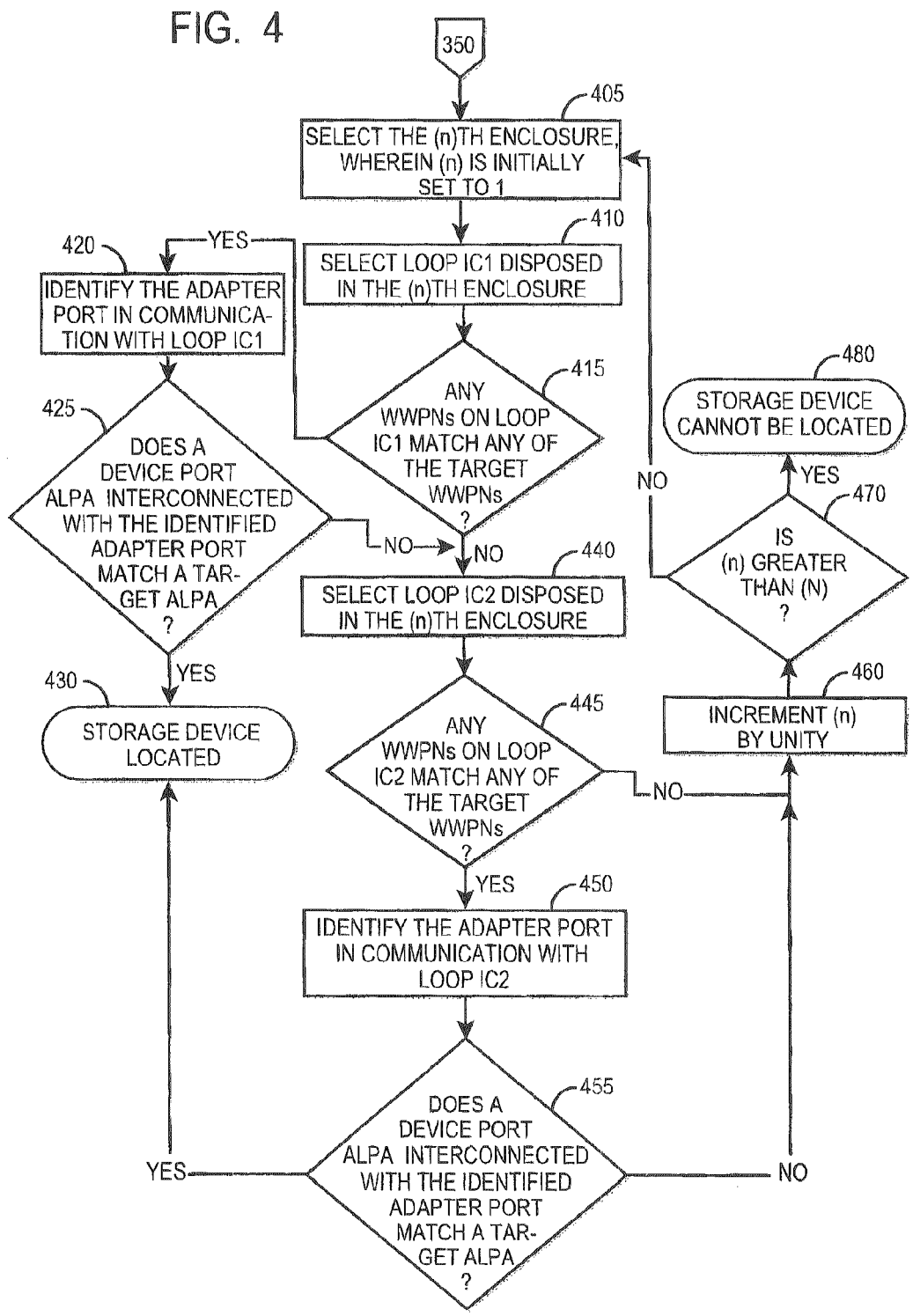

APPARATUS AND METHOD TO LOCATE A STORAGE DEVICE DISPOSED IN A DATA STORAGE SYSTEM

FIELD OF THE INVENTION

This invention relates to an apparatus and method to locate a storage device disposed in a data storage system.

BACKGROUND OF THE INVENTION

Data storage systems are used to store information provided by one or more host computer systems. Such data storage facilities receive requests to write information to a plurality of data storage devices, and requests to retrieve information from that plurality of data storage devices. Upon receipt of a read request, the system recalls information from the plurality of data storage devices, and optionally moves that information to a data cache. Thus, the system is continuously moving information to and from a plurality of data storage devices, and optionally to and from a data cache.

What is needed is a method to locate a storage device disposed in such a data storage system, where that data storage system comprises a plurality of out of band enclosure nodes.

SUMMARY OF THE INVENTION

Applicants' invention comprises a method to locate a data storage device disposed in a data storage system comprising a plurality of data storage device enclosures in communication with a device adapter comprising a plurality of adapter ports, where each of the data storage device enclosures comprises a plurality of data storage devices and two communication pathways interconnected with two of the plurality of adapter ports, where each of the plurality of data storage devices is interconnected with at least one of the two communication pathways.

The method selects a target data storage device comprising a unique World Wide Port Name ("WWPN") and has claimed an address. The method then identifies a target adapter port in communication with the target data storage device, determines one or more target addresses, where each target address is claimed by a data storage device port in communication with the target adapter port, and determines one or more target WWPNs, where each target WWPN is assigned to a storage device port in communication with said target adapter port.

The method selects the (n)th enclosure, where (n) is initially set to 1, selects a first communication pathway disposed in that (n)th enclosure, and determines if any data storage device port interconnected with the first communication pathway comprise a WWPN that matches any of said target WWPNs.

If any data storage device port interconnected with the first communication pathway comprises a WWPN that matches any of said target WWPN, the method then identifies a first adapter port in communication with the selected first communication pathway, and determines if a storage device port interconnected with the first adapter port comprises a data device port address that matches a target address. If a data storage device port interconnected with the first adapter port comprises a data storage device port that has claimed a data storage device port address that matches a target address, then the method locates the target data storage device within the selected (n)th enclosure.

BRIEF DESCRIPTION OF THE DRAWINGS

The invention will be better understood from a reading of the following detailed description taken in conjunction with the drawings in which like reference designators are used to designate like elements, and in which:

FIG. 3 is a flow chart summarizing certain steps of Applicants' method; and

FIG. 4 is a flow chart summarizing additional steps of Applicants' method.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
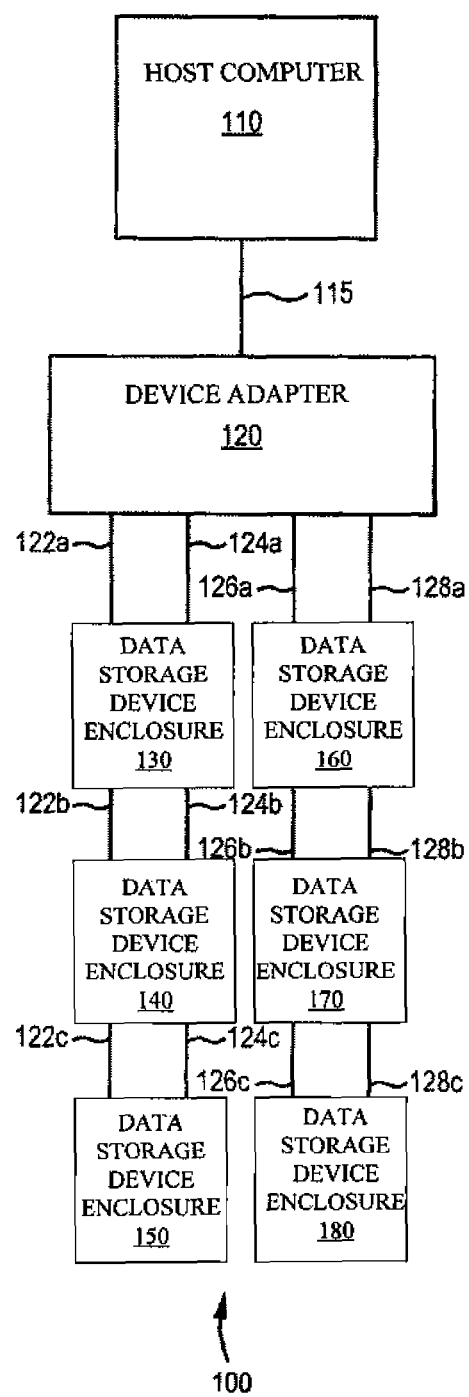
FIG. 1 is a block diagram showing one embodiment of Applicants' data storage system.

Referring now to FIG. 1, data storage system 100 comprises host computer 110, device adapter 120 interconnected with host computer 110 via communication protocol 115, and enclosures 130, 140, 150, interconnected with device adapter 120 via communication links 122a, 124a, 122b, 124b, 122c, and 124c, and enclosures 160, 170, and 180, interconnected with device adapter 120 via communication links 126a, 128a, 126b, 128b, 126c, and 128c. The illustrated embodiment of FIG. 1 shows a single host computer. In other embodiments, Applicants' information system comprises a plurality of host computers.

As a general matter, host computer 110 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, host computer 110 further includes a storage management program. The storage management program in the host computer 110 may include the functionality of storage management type programs known in the art that manage the transfer of data to and from a data storage and retrieval system, such as the IBM DFSMS implemented in the IBM MVS operating system.

Figure 2:
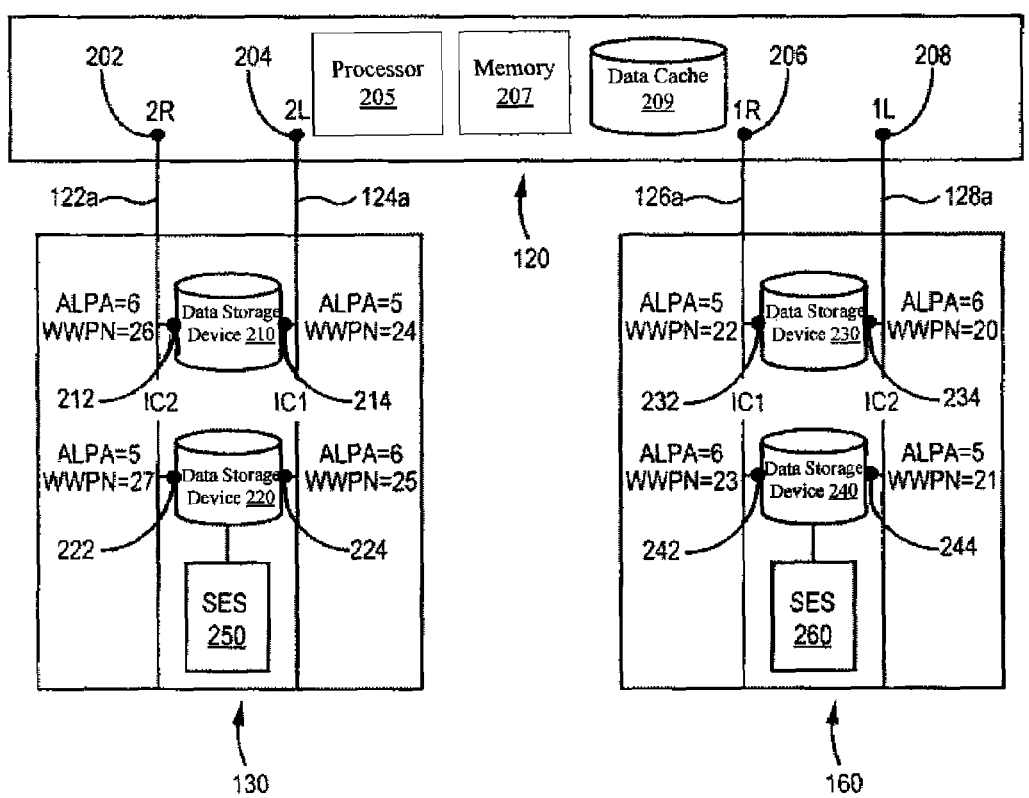
FIG. 2 is a block diagram showing a device adapter interconnected with two out of band enclosure nodes.

Referring now to FIG. 2, device adapter 120 comprises processor 205, memory 207, and optionally data cache 209. In the illustrated embodiment of FIG. 2, device adapter 120 comprises four fibre channel ports, namely ports 202, 204, 206, and 208. In certain embodiments, device adapter 120 identifies those four fibre channel ports as 1L, 1R, 2L, and 2R. In the illustrated embodiment of FIG.2, fibre channel ports 202 and 204, i.e. 2R/2L, comprises a first dual fibre channel loop, and fibre channel ports 206 and 208, i.e. 1R/1L, comprises a second dual fibre channel loop.

FIG. 2 shows two enclosures interconnected with device adapter 120, namely enclosure 130 and enclosure 160. Enclosure 130 comprises a first internal fibre channel loop Interface Card 1 (IC1) and a second internal fibre channel loop Interface Card 2 (IC2), wherein fibre channel link 122a interconnects device adapter fibre channel port 202 and internal fibre channel loop IC2, and wherein fibre channel link 124a interconnects device adapter fibre channel port 204 and internal fibre channel loop IC1.

In the illustrated embodiments of FIG. 2, enclosure 130 comprises two data storage devices, namely data storage device 210 disposed in a first slot and comprising a first port 212 and a second port 214, and data storage device 220 disposed in a second slot and comprising first port 222 and second port 224. In the illustrated embodiment of FIG. 2, ports 212 and 222 are interconnected with internal fibre channel loop IC2, and ports 214 and 224 are interconnected with internal fibre channel loop IC1.

In the illustrated embodiment of FIG. 2, enclosure 130 comprises SCSI Enclosure Services ("SES") processor 250 interconnected with data storage device 220 but not with data storage device 210, and not with either internal fibre channel loop IC1 or IC2. This being the case, SES processor 250 comprises an "out of band" processor, and enclosure 130 is sometimes referred to as an "out of band" enclosure node.

In the illustrated embodiment of FIG. 2, enclosure 160 comprises two data storage devices, namely data storage device 230 disposed in a first slot and comprising a first port 232 and a second port 234, and data storage device 240 disposed in a second slot and comprising first port 242 and second port 244. In the illustrated embodiment of FIG. 2, ports 232 and 242 are interconnected with internal fibre channel loop IC1, and ports 234 and 244 are interconnected with internal fibre channel loop IC2. In the illustrated embodiment of FIG. 2, enclosure 160 comprises SES processor 260 interconnected with data storage device 240 but not with data storage device 230, and not with either internal fibre channel loop IC1 or IC2.

FIG.2 shows enclosures 130 and 160 each comprising two data storage devices for the sake of clarity and illustration. In actual implementation, Applicants' data storage device enclosure comprises more than 2 data storage devices. In certain embodiments, Applicants' data storage device enclosure, such as enclosure 130 and/or enclosure 160, each comprise sixteen data storage devices, wherein four of those sixteen data storage devices are interconnected with the SES processor disposed in that enclosure. In still other embodiments, Applicants' data storage device enclosure, such as enclosure 130 and/or enclosure 160, each comprise more than sixteen data storage devices.

As a general matter, each of the data storage data storage device ports disposed in Applicants' data storage system 100 claims an arbitrated loop physical address ("ALPA"), and comprises a unique world wide port name ("WWPN"). The WWPNs assigned to the two ports disposed in each data storage device disposed in Applicants' data storage system are assigned by the device manufacturer at the time of manufacture.

In the illustrated embodiment of FIG. 2, data storage device port 212 comprises WWPN 26 and has claimed ALPA 6 on IC2 disposed in enclosure 130. Data storage device port 214 comprises WWPN 24 and has claimed ALPA 5 on IC1 disposed in enclosure 130. Data storage device port 222 comprises WWPN 27 and has claimed ALPA 5 on IC2 disposed in enclosure 130. Data storage device port 224 comprises WWPN 25 and has claimed ALPA 6 on IC1 disposed in enclosure 130.

In the illustrated embodiment of FIG. 2, data storage device port 232 comprises WWPN 22 and has claimed ALPA 5 on IC1 disposed in enclosure 160. Data storage device port 234 comprises WWPN 20 and has claimed ALPA 6 on IC2 disposed in enclosure 160. Data storage device port 242 comprises WWPN 23 and has claimed ALPA 6 on IC1 disposed in enclosure 160. Data storage device port 244 comprises WWPN 21 and has claimed ALPA 5 on IC2 disposed in enclosure 160.

A look-up table, database, or the like, encoded in memory 207 and/or processor 205, comprises the WWPN assigned to, and the ALPA claimed by, each data storage device port in communication with device adapter 120. Device adapter 120 does not know, however, the physical locations of the data storage devices disposed in the plurality of interconnected enclosures.

FIG. 3 summarizes the steps of Applicants' method to locate a data storage device disposed in one of the enclosures in data storage system 100 (FIG. 1). Referring now to FIG. 1, in step 310 Applicants' method provides a data storage system comprising (N) storage enclosures in communication with a device adapter, such as device adapter 120 (FIGS. 1, 2), wherein each storage enclosure comprises a plurality of data storage devices, such as for example and without limitation devices 210 (FIG. 2) and 220 (FIG. 2), and two communication pathways, and wherein each storage device is interconnected with at least one of those two pathways.

In step 320, Applicants' method selects a target data storage device to locate, such as for example data storage device 240 (FIG. 2). In certain embodiments, step 320 is performed by an interconnected host computer, such as host computer 110 (FIG. 1).

Applicants' method transitions from step 320 to step 330 wherein the method determines the device adapter ports in communication with the data storage device selected in step 320. In certain embodiments, step 330 is performed by a device adapter, such as device adapter 120 (FIGS. 1, 2). If data storage device 240 is selected in step 320, then in step 330 device adapter 120 determines that the target storage device is interconnected with adapter ports 1L and 1R.

Applicants' method transitions from step 330 to step 340 wherein the method determines the ALPAs claimed by the target data storage device. In certain embodiments, step 330 is performed by the device adapter in communication with the data storage device selected in step 320. For example, if data storage device 240 is selected in step 320, then in step 340 device adapter 120 determines that target data storage device has claimed ALPA 5 on adapter port 1L and ALPA 6 on adapter port 1R.

Applicants' method transitions from step 340 to step 350 wherein the method determines the WWPNs assigned to the storage device ports in communication with the device ports identified in step 330. In certain embodiments, step 350 is performed by the device adapter in communication with the data storage device selected in step 320. For example, if data storage device 240 is selected in step 320, then in step 350 device adapter 120 determines that the data storage device ports in communication with adapter port 1L comprise WWPNs 20 and 21, and the data storage device ports in communication with adapter port 1R comprise WWPNs 22 and 23

Applicants' method transitions from step 350 to step 405 wherein Applicants' method selects the (n)th storage enclosure, wherein (n) is initially set to 1. In certain embodiments, step 405 is performed by the device adapter disposed in the data storage system, such as adapter 120 (FIGS. 1, 2). For example, Applicants' method in step 405 may select enclosure 130.

Applicants' method transitions from step 405 to step 410 wherein the method selects loop IC1 disposed in the enclosure selected in step 405. In certain embodiments, step 405 is performed by the device adapter disposed in the data storage system, such as adapter 120 (FIGS. 1, 2).

Applicants' method transitions from step 410 to step 415 wherein the method determines if any data storage device ports attached to loop IC1 disposed in the enclosure selected in step 405 comprise a WWPN that matches any of the WWPNs determined in step 350. In certain embodiments, step 415 is performed by the device adapter disposed in the data storage system, such as adapter 120 (FIGS. 1, 2).

For example, if data storage device 340 is selected in step 320, and if enclosure 130 is selected in step 405, then Applicants' method determines in step 415 that no data storage device ports in communication with loop IC1 disposed in enclosure 130 comprise WWPNs 20, 21, 22, or 23.

If Applicants' method determines in step 415 that no data storage device ports attached to loop IC1 disposed in the enclosure selected in step 405 comprise a WWPN that matches any of the WWPNs determined in step 350, then the method transitions from step 415 to step 440 wherein the method selects loop IC2 disposed in the enclosure selected in step 405. In certain embodiments, step 440 is performed by the device adapter disposed in the data storage system, such as adapter 120 (FIGS. 1, 2).

Applicants' method transitions from step 440 to step 445 wherein the method determines if any data storage device ports attached to loop IC2 disposed in the enclosure selected in step 405 match the WWPNs determined in step 350. In certain embodiments, step 415 is performed by the device adapter disposed in the data storage system, such as adapter 120 (FIGS. 1, 2).

For example, if data storage device 340 is selected in step 320, and if enclosure 130 is selected in step 405, then Applicants' method determines in step 415 that no data storage device ports attached to loop IC2 disposed in enclosure 130 comprise WWPNs 20, 21, 22, or 23.

If Applicants' method determines in step 445 that no data storage device ports attached to loop IC2 disposed in the enclosure selected in step 405 match the WWPNs determined in step 350, then the method transitions from step 445 to step 460 wherein the method increments (n) by unity. In certain embodiments, step 460 is performed by the device adapter disposed in the data storage system, such as adapter 120 (FIGS. 1, 2).

Applicants' method transitions from step 460 to step 470 wherein the method determines if (n) is greater than (N). In certain embodiments, step 470 is performed by the device adapter disposed in the data storage system, such as adapter 120 (FIGS. 1, 2). If Applicants' method determines in step 470 that (n) is greater than (N), then the method transitions from step 470 to step 480 wherein the method determines that the storage device selected in step 320 cannot be located. In certain embodiments, step 480 comprises providing a message that the selected data storage device could not be located.

Alternatively, if Applicants' method determines in step 470 that (n) is not greater than (N), then the method transitions from step 470 to step 405 wherein the method selects the (n)th enclosure, such as for example enclosure 160 (FIG. 2). In certain embodiments, step 415 is performed by the device adapter disposed in the data storage system, such as adapter 120 (FIGS. 1, 2).

Applicants' method transitions from step 405 to step 410 wherein the method selects loop IC1 disposed in the enclosure selected in step 405. In certain embodiments, step 405 is performed by the device adapter disposed in the data storage system, such as adapter 120 (FIGS. 1, 2).

Applicants' method transitions from step 410 to step 415 wherein the method determines if any data storage device ports attached to loop IC1 disposed in the enclosure selected in step 405 comprise a WWPN that matches any of the WWPNs determined in step 350. In certain embodiments, step 415 is performed by the device adapter disposed in the data storage system, such as adapter 120 (FIGS. 1, 2).

For example, if data storage device 240 is selected in step 320, and if enclosure 160 is selected in step 405, then Applicants' method determines in step 415 that a data storage device node attached to loop IC1 disposed in enclosure 160 comprises WWPN 23 which matches one of the WWPNs determined in step 350 to be interconnected with device port 1R.

If Applicants' method determines in step 415 that a data device node attached to loop IC1 disposed in the enclosure selected in step 405 comprises a WWPN that matches one of the WWPN determined in step 350, then the method transitions from step 415 to step 420 wherein the method identifies the adapter port in communication with loop IC1 disposed in the enclosure selected in step 405. For example, if data storage device 240 is selected in step 320, and if enclosure 160 is selected in step 405, then in step 420 Applicants' method determines that internal fiber channel loop IC1 in enclosure 160 is interconnected with device adapter port 1R.

Applicants' method transitions from step 420 to step 425 wherein the method determines if a data storage port in communication with the adapter port identified in step 420 has claimed an ALPA matching an ALPA identified in step 340 (FIG. 3). For example, if data storage device 240 is selected in step 320, then ALPAs 5 and 6 would be identified in step 340, and in step 425 Applicants' method would determine that data storage device node 242 attached to internal fiber channel loop 1R in enclosure 160 has claimed ALPA 6.

If Applicants' method determines in step 425 that a data storage port in communication with the adapter port identified in step 420 has claimed an ALPA matching an ALPA identified in step 340, then the method transitions from step 425 to step 430 wherein the method reports the physical location of the data storage device selected in step 320.

The SES Processor disposed in enclosure 160, namely SES Processor 260, knows the ALPA claimed by each data storage device node attached to each of the internal fibre channel loops IC1 and IC2. In certain embodiments, step 430 is performed by the SES Processor disposed in the enclosure comprising the selected data storage device.

For example, if data storage device 240 is selected in step 320, then ALPAs 5 and 6 would be identified in step 340, and in step 425 Applicants' method would determine that data storage device port 242 has claimed ALPA 6 on internal fiber channel loop 1R, and that data storage device 240 which comprises port 242 is disposed in the second slot of enclosure 160.

If Applicants' method determines that a data storage device port attached to the internal fiber channel loop identified in step 420 has not claimed an ALPA matching an ALPA identified in step 340, then the method transitions from step 425 to step 440 wherein the method selects loop IC2 disposed in the enclosure selected in step 405. For example, if data storage device 240 is selected in step 320, then ALPAs 5 and 6 would be identified in step 340, but if data storage device port 242 was not functioning then in step 425 Applicants' method would determine that no data storage device port interconnected with loop IC1 in enclosure 160 has claimed ALPA 6, and therefore, Applicants' method would transition from step 425 to step 440.

As described above, Applicants' method transitions from step 440 to step 445 wherein the method determines if any data storage device ports attached to loop IC2 disposed in the enclosure selected in step 405 match the WWPNs determined in step 350.

For example, if data storage device 240 is selected in step 320, and if enclosure 160 is selected in step 405, then Applicants' method determines in step 445 that a data storage device port attached to loop IC2 disposed in enclosure 160 comprises WWPN 21 which matches one of the WWPNs determined in step 350 to be interconnected with device port 1L.

If Applicants' method determines in step 445 that a data storage device port attached to loop IC2 disposed in the enclosure selected in step 405 matches a WWPN determined in step 350, then the method transitions from step 445 to step 450 wherein the method identifies the adapter port in communication with loop IC2 disposed in the enclosure selected in step 405. For example, if data storage device 240 is selected in step 320, and if enclosure 160 is selected in step 405, then in step 450 Applicants' method determines that internal fiber channel loop IC2 in enclosure 160 is interconnected with device adapter port 1L.

Applicants' method transitions from step 450 to step 455 wherein the method determines if a data storage port in communication with the adapter port identified in step 450 has claimed an ALPA matching an ALPA identified in step 340 (FIG. 3). If Applicants' method determines in step 455 that no data storage port in communication with the adapter port identified in step 450 has claimed an ALPA matching an ALPA identified in step 340 (FIG. 3), then the method transitions from step 455 to step 460 and continues as described herein.

Alternatively, if Applicants' method determines in step 455 that a data storage device port in communication with the adapter port identified in step 450 has claimed an ALPA matching an ALPA identified in step 340 (FIG. 3), then the method transitions from step 455 to step 430 wherein the method reports the physical location of the selected data storage device.

For example, if data storage device 240 is selected in step 320, then ALPAs 5 and 6 would be identified in step 340, and in step 455 Applicants' method would determine that data storage device node 244 attached to internal fiber channel loop 1L in enclosure 160 has claimed ALPA 5. In step 430, Applicants' method would report that the data storage device selected in step 320, namely data storage device 240, is disposed in the second slot of enclosure 160.

In certain embodiments, individual steps recited in FIG. 3 and/or FIG. 4, may be combined, eliminated, or reordered.

In certain embodiments, Applicants' invention includes instructions residing in memory, such as memory 207 (FIG. 2), disposed in a device adapter, such as device adapter 120 (FIGS. 1, 2), disposed in Applicants' data storage system, such as data storage system 100, wherein those instructions are executed by a processor, such as processor 205 (FIG. 2), to perform one or more of steps 330, 340, 350, recited in FIG. 3, and/or one or more of steps 405, 410, 415, 420, 425, 430, 440, 445, 450, 455, 460, 470, and/or 480, recited in FIG. 4.

In other embodiments, Applicants' invention includes instructions residing in any other computer program product, where those instructions are executed by a computer external to, or internal to, system 100, to perform one or more of steps 330, 340, 350, recited in FIG. 3, and/or one or more of steps 405, 410, 415, 420, 425, 430, 440, 445, 450, 455, 460, 470, and/or 480, recited in FIG. 4. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to locate a data storage device disposed in a data storage system, comprising the steps of:
    providing a data storage system comprising a plurality of SCSI Enclosure Service ("SES") processors and a plurality of data storage device enclosures attached to a device adapter comprising a plurality of adapter ports, wherein each of said plurality of data storage device enclosures comprises a different SES processor, a plurality of data storage devices and two communication pathways interconnected with two of said plurality of adapter ports, wherein each of said plurality of data storage devices is interconnected with at least one of said two communication pathways, and wherein said device adapter further comprises a memory and a database encoded in said memory, wherein said database comprises a World Wide Port Name assigned to each data storage device port in communication with said device adapter and a loop address claimed by said each data storage device port in communication with said device adapter, but where even after data storage system initialization and operation the physical locations of the data storage devices disposed in said plurality of data storage device enclosures are not known to said plurality of SES processors and to said device adapter;
    selecting a target data storage device to locate, wherein said target data storage device comprises at least one data storage device port comprising a unique World Wide Port Name and a loop address and wherein the data storage device enclosure comprising the target data storage device is not known;
    identifying one or more target adapter ports, wherein each target adapter port is in communication with said target data storage device;
    determining one or more target loop addresses, wherein each target loop address is claimed by a data storage device port in communication with said one or more target adapter ports;

determining one or more target World Wide Port Names, wherein each target World Wide Port Name is assigned to a data storage device port in communication with said one or more target adapter ports;

selecting a first data storage device enclosure, wherein said first data storage device enclosure comprises one of said plurality of data storage device enclosures;

selecting a first communication pathway disposed in said first data storage device enclosure;

determining if a World Wide Port Name associated with any data storage device port interconnected with said first communication pathway matches any of said target World Wide Port Names;

operative if the World Wide Port Name associated with any said data storage device port interconnected with said first communication pathway matches any of said target World Wide Port Names, identifying a first adapter port, wherein said first adapter port is in communication with said first communication pathway;

determining if a data storage device port interconnected with said first adapter port has claimed a loop address that matches the target loop address;

operative if the data storage device port interconnected with said first adapter port has claimed the loop address that matches the target loop address, reporting a physical location of said target data storage device within said first data storage device enclosure.

2. The method of claim 1, wherein:

said data storage system further comprises a host computer in communication with said device adapter;

said device adapter further comprises a device adapter processor;

said host computer performs said selecting steps; and said device adapter processor performs said identifying step and said determining steps.

3. The method of claim 1, wherein:

said device adapter comprises a device adapter processor, and said device adapter processor performs said selecting the first communication pathway step, said determining if the World Wide Port Names associated with said data storage device port interconnected with said first communication pathway matches any of said target World Wide Port Names step, said identifying the first adapter port step, and said determining if the data storage device port interconnected with said first adapter port has claimed said loop address that matches the target loop address step.

4. The method of claim 1, further comprising the steps of:

operative if no data storage device port interconnected with said first adapter port has claimed said loop address that matches the target loop address, selecting a second communication pathway disposed in said first data storage device enclosure;

determining if the World Wide Port Name associated with any data storage device port interconnected with said second communication pathway matches any of said target World Wide Port Names;

operative if a World Wide Port Names associated with any said data storage device port interconnected with said second communication pathway matches any of said target World Wide Port Names, identifying a second adapter port, wherein said second adapter port is in communication with said second communication pathway;

determining if a data storage device port interconnected with said second adapter port has claimed a loop address that matches the target loop address;

operative if the data storage device port interconnected with said second adapter port has claimed the loop address that matches the target loop address, reporting the physical location of said target data storage device within said first data storage device enclosure.

5. The method of claim 4, wherein said device adapter comprises a device adapter processor, wherein said device adapter processor performs the steps of claim 4.

6. A device adapter comprising a processor, a plurality of adapter ports, and a computer readable medium having computer readable program code disposed therein to locate a data storage device disposed in a data storage system, said data storage system comprising a plurality of data storage device enclosures in communication with said device adapter and a plurality of SCSI Enclosure Service ("SES") processors, wherein each of said plurality of data storage device enclosures comprises a different SES processor, a plurality of data storage devices and two communication pathways interconnected with two of said plurality of adapter ports, wherein each of said plurality of data storage devices is interconnected with at least one of said two communication pathways, wherein said device adapter further comprises a memory and a database encoded in said memory, wherein said database comprises a World Wide Port Name assigned to each data storage device port in communication with said device adapter and an arbitrated loop physical address claimed by said each data storage device port in communication with said device adapter, but where even after data storage system initialization and operation the physical locations of the data storage devices disposed in said plurality of data storage device enclosures are not known to said plurality of SES processors and to said device adapter, the computer readable program code comprising a series of computer readable program steps to effect:

receiving a signal designating a target data storage device to locate wherein said target data storage device comprises at least one data storage device port comprising a unique World Wide Port Name and a loop address and wherein the data storage device enclosure comprising the target data storage device is not known;

determining a target adapter port in communication with said target data storage device;

determining one or more target loop addresses, wherein each target loop address is claimed by a data storage device port in communication with said target adapter port;

determining one or more target World Wide Port Names, wherein each target World Wide Port Name is assigned to a data storage device port in communication with said target adapter port;

selecting a first data storage device enclosure, wherein said first data storage device enclosure comprises one of said plurality of data storage device enclosures;

selecting a first communication pathway disposed in said first data storage device enclosure;

determining if a World Wide Port Name associated with any data storage device port interconnected with said first communication pathway matches any of said target World Wide Port Names;

operative if the World Wide Port Names associated with said any data storage device port interconnected with said first communication pathway matches any of said target World Wide Port Names, identifying a first adapter port, wherein said first adapter port is in communication with said first communication pathway;

determining if a data storage device port interconnected with said first adapter port comprises a loop address that matches the target loop address;

operative if the data storage device port interconnected with said first adapter port comprises the loop address that matches the target loop address, reporting a physical location of said target data storage device within said first data storage device enclosure.

7. The device adapter of claim 6, wherein each of said communication pathways comprises a fibre channel arbitrated loop.

8. The device adapter of claim 6 said computer readable program code further comprising a series of computer readable program steps to effect:

operative if no data storage device port interconnected with said first adapter port comprises a loop address that matches the target loop address, selecting a second communication pathway disposed in said first data storage device enclosure;

determining if a World Wide Port Name associated with any data storage device port interconnected with said second communication pathway matches any of said target World Wide Port Names;

operative if the World Wide Port Names associated with said any data storage device port interconnected with said second communication pathway matches any of said target World Wide Port Names, identifying a second adapter port, wherein said second adapter port is in communication with said second communication pathway;

determining if a data storage device port interconnected with said second adapter port has claimed a-loop address that matches the target loop address;

operative if the data storage device port interconnected with said second adapter port has claimed the-loop address that matches the target loop address, reporting a physical location of said target data storage device within said first data storage device enclosure.

9. A computer program product encoded in a computer readable storage medium disposed in a device adapter comprising a processor, and a plurality of adapter ports, said computer program product being useable with said processor to locate a data storage device disposed in a data storage system, said data storage system comprising a plurality of data storage device enclosures in communication with said device adapter and a plurality of SCSI Enclosure Service ("SES") processors, wherein each of said plurality of data storage device enclosures comprises a different SES processor, a plurality of data storage devices and two communication pathways interconnected with two of said plurality of adapter ports, wherein each of said plurality of data storage devices is interconnected with at least one of said two communication pathways, wherein said device adapter further comprises a memory and a database encoded in said memory, wherein said database comprises a World Wide Port Name assigned to each data storage device port in communication with said device adapter and a loop address claimed by said each data storage device port in communication with said device adapter, but where even after data storage system initialization and operation the physical locations of the data storage devices disposed in said plurality of data storage device enclosures are not known to said plurality of SES processors and to said device adapter, comprising:

computer readable program code which causes said programmable computer processor to receive a signal designating a target data storage device to locate wherein said target data storage device comprises at least one data storage device port comprising a unique World Wide Port Name and a loop address;

computer readable program code which causes said programmable computer processor to determine a target adapter port in communication with said target data storage device;

computer readable program code which causes said programmable computer processor to determine one or more target loop addresses, wherein each target loop address is claimed by a data storage device port in communication with said target adapter port;

computer readable program code which causes said programmable computer processor to determine one or more target World Wide Port Names, wherein each target World Wide Port Name is assigned to a data storage device port in communication with said target adapter port;

computer readable program code which causes said programmable computer processor to select a first data storage device enclosure, wherein said first data storage device enclosure comprises one of said plurality of data storage device enclosures;

computer readable program code which causes said programmable computer processor to select a first communication pathway disposed in said first data storage device enclosure;

computer readable program code which causes said programmable computer processor to determine if a World Wide Port Name associated with any data storage device port interconnected with said first communication pathway matches any of said target World Wide Port Names;

computer readable program code which, if the World Wide Port Name associated with said any data storage device port interconnected with said first communication pathway matches any of said target World Wide Port Names, causes said programmable computer processor to identify a first adapter port in communication with said first communication pathway;

computer readable program code which causes said programmable computer processor to determine if a data storage device port interconnected with said first adapter port has claimed a loop address that matches the target loop address;

computer readable program code which, if the data storage device port interconnected with said first adapter port has claimed the loop address that matches the target loop address, causes said programmable computer processor to report a physical location of said target data storage device within said selected first data storage device enclosure.

10. The computer program product of claim 9, wherein each of said communication pathways comprises a fibre channel arbitrated loop, and wherein each loop address comprises an arbitrated loop physical address.

11. The computer program product of claim 9, further comprising:

computer readable program code which, if no data storage device port interconnected with said first adapter port has claimed the loop address that matches the target loop address, causes said programmable computer processor to select a second communication pathway disposed in said first data storage device enclosure;

computer readable program code which causes said programmable computer processor to determine if a World Wide Port Name associated with any data storage device port interconnected with said second communication pathway matches any of said target World Wide Port Names;

computer readable program code which, if the World Wide Port Name associated with said any data storage device port interconnected with said second communication pathway matches any of said target World Wide Port Names; causes said programmable computer processor to identify a second adapter port, wherein said second adapter port is in communication with said second communication pathway;

computer readable program code which causes said programmable computer processor to determine if a data storage device port interconnected with said second adapter port has claimed the loop address that matches the target loop address;

computer readable program code which, if a data storage device port interconnected with said second adapter port has claimed the loop address that matches the target loop address, causes said programmable computer processor to report a physical location of said target data storage device within said first data storage device enclosure.

* * * * *